United States Patent [19]

Engert

[11] 4,229,050
[45] Oct. 21, 1980

[54] BRAKE FORCE REGULATOR FOR A MOTORCYCLE HYDRAULIC BRAKE SYSTEM

[75] Inventor: Klaus Engert, Buerstadt, Fed. Rep. of Germany

[73] Assignee: ITT Industries, Inc., New York, N.Y.

[21] Appl. No.: 27,980

[22] Filed: Apr. 9, 1979

[30] Foreign Application Priority Data

May 26, 1978 [DE] Fed. Rep. of Germany ....... 2822933

[51] Int. Cl.³ .............................................. B60T 8/26
[52] U.S. Cl. .................................... 303/6 C; 188/344
[58] Field of Search ............... 188/344; 303/6 A, 6 C; 60/576, 579

[56] References Cited

U.S. PATENT DOCUMENTS

| 4,027,923 | 6/1977 | Saito | 303/6 C |
| 4,174,867 | 11/1979 | Oberthür | 303/6 C |

Primary Examiner—Duane A. Reger

Attorney, Agent, or Firm—John T. O'Halloran; Alfred C. Hill

[57] ABSTRACT

In a known motorcycle brake system, the pedal-actuated master cylinder acts on the front-wheel brake and the rear-wheel brake and the hand-actuated master cylinder acts on the front-wheel brake. The brake force regulator's control behavior provided by a stepped control piston is influenced by the hand-actuated master cylinder. This known system has functional disadvantages since the rear-wheel brake is evacuated of fluid by movement of the control piston if the hand-actuated master cylinder is actuated alone. In addition, the regulator's change-over point is reached at a relatively high pressure. These disadvantages are eliminated in the present invention by the provision of a valve adapted to close independently of the position of the stepped piston which is prevented from moving when the hand-actuated master cylinder is actuated alone by a stop against which the stepped piston abuts.

4 Claims, 1 Drawing Figure

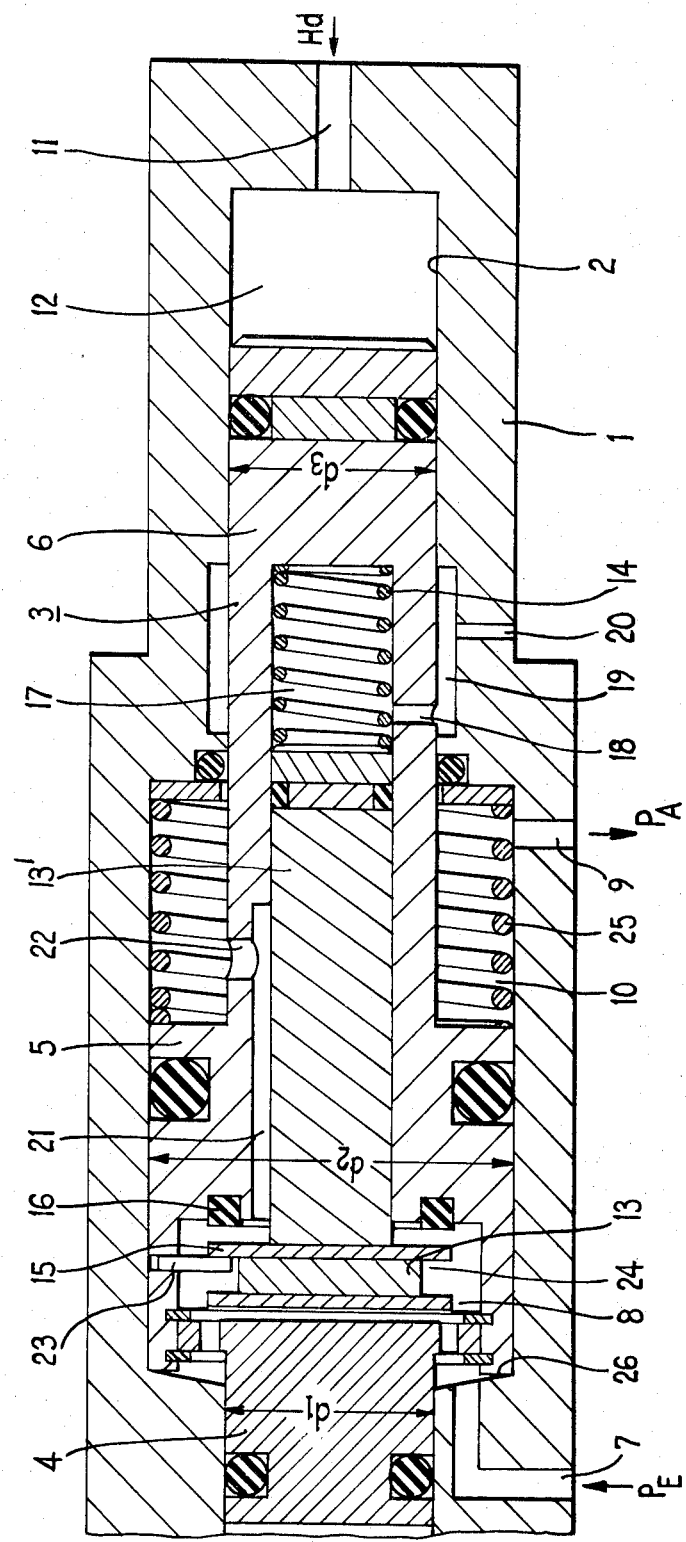

BRAKE FORCE REGULATOR FOR A MOTORCYCLE HYDRAULIC BRAKE SYSTEM

BACKGROUND OF THE INVENTION

The present invention relates to a brake force regulator for a motorcycle interconnected hydraulic brake system including a control piston, which is slidable in response to the pressure from a hand cylinder, adapted to reduce the brake pressure of a pedal-actuated rear-wheel brake by arranging for the control piston to be movable into a fluid inlet chamber connected with the pedal cylinder, such movement being caused by the pressure from the hand cylinder under increase in volume of a fluid outlet chamber connected with the rear-wheel brake, the control piston having a fluid passageway including a closure member through which the fluid inlet chamber is connectible with the fluid outlet chamber. A brake force regulator of this type is described in German Patent DE-OS 2,558,825.

In motorcycles, a rear-wheel lock leads to the vehicle tending to turn about its vertical axis, as is the case in the event of a locked condition of the rear wheels of a four-wheeled vehicle. Therefore, overbraking of the rear wheel must be avoided. In the brake system disclosed in German Patent DE-OS 2,558,825, this is achieved by the provision of a stepped piston of simple design which is displaced responsive to the pressure in the front-wheel brake, thereby reducing the pressure in the rear-wheel brake. In this manner, the brake force at the rear wheel is reduced in response to the shift of weight to the front wheel caused by the additional actuation of the front-wheel brake.

Though this prior known brake force regulator is of simple construction, it has the disadvantage that the stepped piston is displaced on actuation of the front-wheel brake even when the rear-wheel brake is not applied. This causes the stepped piston to draw fluid from the rear-wheel brake. The result is inevitably an increased brake clearance when the rear-wheel brake is actuated. The case may even be that, upon repeated actuation of the front-wheel brake, the stepped piston of the brake force regulator operates in the manner of a pump evacuating the rear-wheel brake of fluid to such an extent that pressure is unable to be developed in the rear-wheel brake no matter how far the pedal is depressed.

To eliminate this disadvantage, a motorcycle brake system has been proposed in copending U.S. Patent application Ser. No. 916,630, filed June 19, 1978 of H. H. Luepertz, having the same assignee as the present application, a brake force regulator including a slidably sealed first piston forming on one end a boundary for an inlet chamber connected with the pedal cylinder and on the other end a boundary for an outlet chamber connected with the rear-wheel brake, a passageway in the first piston adapted to be closed by a valve closure member which is preloaded in the open position and urged by the pedal-cylinder pressure in the closing direction, and a rod bearing upon the first piston in the outlet chamber, the rod being linked to a second piston subjected to the hand-cylinder pressure in the direction towards the first piston. From the point of view of its function, this brake force regulator admittedly represents an advance over the brake force regulator disclosed in German Patent DE-OS 2,558,825, its construction is, however, substantially more complicated. If the fluid connection from the pedal cylinder to the rear-wheel brake is to be interrupted by the hand-cylinder pressure, it is necessary to displace elements having a total of three seals. This necessitates a high response force.

SUMMARY OF THE INVENTION

It is an object of the present invention to provide a brake force regulator of the type referred to hereinabove such that no fluid is drawn from the rear-wheel brake when the hand cylinder alone is actuated, which is of particularly straightforward construction and where the frictional forces to be overcome for its actuation are as low as possible.

A feature of the present invention is the provision of a brake force regulator for a motorcycle brake system comprising: a housing having a longitudinal stepped bore; a fluid inlet chamber connected to a pedal-actuated master cylinder of a rear-wheel brake circuit disposed in the bore; a fluid outlet chamber connected to a rear-wheel brake of the rear-wheel brake circuit disposed in said bore spaced from the inlet chamber; a control piston slidably sealed to the bore, the control piston having first, second and third stepped sections in that order, adjacent ends of the first and second sections being associated with the inlet chamber and adjacent ends of the second and third sections being associated with the outlet chamber, the control piston being responsive to pressure from a hand-actuated master cylinder of a front-wheel brake circuit applied to an end of the third section remote from the second section to control pressure applied to the rear-wheel brake; a fluid passageway disposed in the control piston interconnecting the inlet and outlet chambers; a closure member for the passageway disposed in the inlet chamber; a closure piston connected to the closure member and extending into a bore in the control piston, the closure piston being movable in the closing direction of the closure member against the force of a valve spring contained in a valve chamber at the end of the bore in the control piston, the valve chamber being connected to atmosphere; and a weak return spring disposed in the outlet chamber to urge the control piston against a stop in the bore in the inlet chamber, the control piston having a differential effective area adjacent the stop subjected to pressure in the inlet chamber in a direction opposite to the direction of the force of the return spring to cause displacement of the control piston in the direction of the outlet chamber.

Since, for pressure reduction, the control piston is held in abutment with a stop on the side close to the fluid inlet chamber, it will maintain this position unchanged if only the hand cylinder is operated. The drawing in of fluid from the rear-wheel brake is thereby precluded. The closure member is able to close in the presence of a very low pressure, because it is required to move against atmospheric pressure in opposition to the force of a weak closure spring by overcoming no more than the friction of a single seal. The fluid connection between the fluid inlet chamber and the fluid outlet chamber and consequently between the pedal cylinder and the rear-wheel brake is thereby interrupted at a low pressure. To increase the pressure in the rear-wheel brake further, the control piston is displaced in the direction of the fluid outlet chamber. Conversely, the low change-over pressure is that pressure up to which a pressure decrease is possible when the hand cylinder is actuated. The change-over pressure is of high importance because, as a result of the high center of gravity of a motorcycle during strong braking, nearly all weight is removed from the rear wheel so that the pressure there, too, has to be decreased nearly completely.

In the event of a failure of the rear-wheel brake during a braking operation, the connection from the brake force regulator to the rear-wheel brake remains closed so that a front-wheel brake connected to the same brake circuit continues to be fully operable because the fluid is not allowed to be discharged through the defective rear-wheel brake. Also, in the event of a leakage of the rear-wheel brake, it is possible to obtain an unreduced actuation of the front-wheel brake connected to the same brake circuit.

The closure piston may be integral with the closure member forming an extension thereof, or it may be a separate element.

In an advantageous embodiment of the present invention, the control piston extends out of the fluid inlet chamber in a sealed relationship providing a first effective area, isolates the fluid outlet chamber from the fluid inlet chamber by a second effective area which is greater than the first effective area, and extends out of the fluid outlet chamber providing a third effective area which is of the same size as the first effective area.

Because of this design, the area in the fluid outlet chamber pressurizing the rear-wheel brake is equal to the effective area which is subjected to pressure in the fluid inlet chamber. As a result, the pressure in the rear-wheel brake is always equal to the pedal-cylinder pressure generated so long as no pressure is produced with the hand cylinder. This permits the building up of pressure in the rear-wheel brake in the ratio of 1:1.

It is to be understood that the individual effective areas of the control piston may be dimensioned such that the brake force regulator operates as a booster or as a reducer. The use as a reducer requires, however, the provision of additional measures in order to provide the brake force regulator with a suitable control characteristic.

In another advantageous embodiment of the invention, the section of the control piston extending out of the fluid outlet chamber projects into a counter-pressure chamber which is in communication with the hand cylinder. This embodiment affords a particularly straightforward design. The hand-cylinder pressure displaces the control piston directly. This eliminates the need for an auxiliary piston acting on the piston of the brake force regulator through a rod.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross section of one embodiment of a brake force regulator for a motorcycle hydraulic brake system in accordance with the principles of the present invention.

DESCRIPTION OF THE PREFERRED EMBODIMENT

The FIGURE shows a brake force regulator including a housing 1 having a multiply stepped bore 2. Axially slidable in bore 2 is a control piston 3. Control piston 3 comprises a first section 4 with an effective area d1, a second section 5 with an effective area d2, and a third section 6 with an effective area d3.

Housing 1 has a fluid inlet port 7 through which fluid arriving from a pedal master cylinder (not shown) is delivered to a fluid inlet chamber 8. Section 4 of control piston 3 extends with its first effective area d1 out of fluid inlet chamber 8 in a sealed relationship thereto. Housing 1 further includes a fluid outlet port 9 through which fluid may be discharged from a fluid outlet chamber 10 to a rear-wheel brake. A fluid inlet port 11 serves to deliver pressure-transmitting fluid from a hand master cylinder (not shown) to a counter-pressure chamber 12 so that a force acts upon effective area d3 of section 6 of control piston 3.

Control piston 3 is a hollow piston open on one end in chamber 8. Guided in a sealed relation in the interior of control piston 3 is a closure member 13. The closure member is integral with a closure piston 13' representing an extension of closure member 13. The force of a weak closure spring 14, which acts on closure piston 13', keeps the closure member's valve plate 15 spaced from a seal 16 on the end surface of control piston 3. Closure spring 14 is housed in a valve chamber 17 which is provided in the interior of section 6 of control piston 3 and connects with atmosphere through a bore 18, an annular groove 19 in housing 1 and another bore 20.

So long as closure member 13 is in its open position illustrated in the FIGURE, a fluid connection is possible from inlet chamber 8 through a longitudinal groove 21 interiorly of control piston 3 and through a cross bore 22 to outlet chamber 10. In the embodiment illustrated, the open position of closure member 13 is limited by a pin 23 which extends into a circumferential groove 24 of valve plate 15. Pin 23 also has the function of retaining closure member 13 in section 5 of control piston 3 during assembly.

For operation of the brake force regulator a return spring 25 is of importance which is disposed in outlet chamber 10 and engages between housing 1 and section 5 of control piston 3. In the inactivated position of the arrangement, return spring 25, which may be relatively weak, acts upon control piston 3 to the left when viewing the FIGURE so that it is in abutment with a stop 26 formed on housing 1.

The mode of operation of the brake force regulator described is as follows: Assume first that only the hand cylinder is activated, that means only the front-wheel brake is to be used for braking. In that event, pressure-transmitting fluid is supplied through inlet port 11 to counter-pressure chamber 12. As a result, a force acts upon the effective area d3 of control piston 3. This merely leads to control piston 3 being urged against housing stop 26 with an increasing force. All elements of the brake force regulator remain in their illustrated positions so that the rear-wheel brake is by no means affected by the brake force regulator.

Assume now that only the pedal cylinder is activated. In that event, pressure-transmitting fluid passes through fluid inlet port 7 into fluid inlet chamber 8 and, hence, through longitudinal bore 21 and cross bore 22 into fluid outlet chamber 10. From fluid outlet chamber 10, the fluid flows through fluid outlet port 9 to the rear-wheel brake. In the event of a second front-wheel brake being available, this brake may be applied by the pressure from the pedal cylinder directly. The pressure in fluid inlet chamber 8 acts on closure piston 13', displacing it with closure member 13 against the force of closure spring 14 to the right when viewing the FIGURE towards valve chamber 17 until valve plate 15 is seated on seal 16. The connection from fluid inlet chamber 8 to fluid outlet chamber 10 is thus interrupted. With the pressure continuing to be applied, control piston 3 is displaced to the right when viewing the drawing, in response to the force acting on the differential area between effective areas d2 and d1, so that the second section 5 of control piston 3, with its differential area d2 minus d1, is able to urge fluid out of fluid outlet chamber 10, thereby applying the rear-wheel brake.

If the hand cylinder is actuated at the same time, a pressure will develop in counter-pressure chamber 12 which either prevents movement of control piston 3 in the brake-applying direction, that means to the right when viewing the drawing, ore even shifts it back to the left when viewing the drawing. This results in a pressure decrease in the rear-wheel brake so that the volume of fluid outlet chamber 10 is enlarged because of the movement of control piston 3 in the direction of its housing stop 26.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake force regulator for a motorcycle brake system comprising:
    a housing having a longitudinal stepped bore;
    a fluid inlet chamber connected to a pedal-actuated master cylinder of a rear-wheel brake circuit disposed in said bore;
    a fluid outlet chamber connected to a rear-wheel brake of said rear-wheel brake circuit disposed in said bore spaced from said inlet chamber;
    a control piston slidably sealed to said bore, said control piston having first, second and third stepped sections in that order, adjacent ends of said first and second sections being associated with said inlet chamber and adjacent ends of said second and third sections being associated with said outlet chamber, said control piston being responsive to pressure from a hand-actuated master cylinder of a front-wheel brake circuit applied to an end of said third section remote from said second section to control pressure applied to said rear-wheel brake;
    a fluid passageway disposed in said control piston interconnecting said inlet and outlet chambers;
    a closure member for said passageway disposed in said inlet chamber;
    a closure piston connected to said closure member and extending into a bore in said control piston, said closure piston being movable in the closing direction of said closure member against the force of a valve spring contained in a valve chamber at the end of said bore in said control piston, said valve chamber being connected to atmosphere; and
    a weak return spring disposed in said outlet chamber to urge said control piston against a stop in said bore in said inlet chamber, said control piston having a differential effective area adjacent said stop subjected to pressure in said inlet chamber in a direction opposite to the direction of the force of said return spring to cause displacement of said control piston in the direction of said outlet chamber.

2. A regulator according to claim 1, wherein
    said first section extends out of said inlet chamber in a sealed relation with said bore and has a first effective area,
    said second section isolates said outlet chamber from said inlet chamber and has a second effective area greater than said first effective area, and
    said third section extends out of said outlet chamber in a sealed relation with said bore and has a third effective area equal to said first effective area.

3. A regulator according to claim 2, wherein
    said end of said third section is in a counter-pressure chamber which is in communication with said hand-actuated master cylinder.

4. A regulator according to claim 1, wherein
    said end of said third section is in a counter-pressure chamber which is in communication with said hand-actuated master cylinder.

* * * * *